United States Patent [19]

Noakes

[11] Patent Number: 5,269,975

[45] Date of Patent: Dec. 14, 1993

[54] SOLIDIFICATION OF ORGANIC WASTE MATERIALS IN CEMENT

[76] Inventor: John E. Noakes, 4295 Barnett Shoals Rd., Athens, Ga. 30605

[21] Appl. No.: 942,988

[22] Filed: Sep. 10, 1992

Related U.S. Application Data

[63] Continuation of Ser. No. 659,748, Feb. 21, 1991.

[51] Int. Cl.$^5$ ............................................. G21F 9/16
[52] U.S. Cl. ................................. 252/628; 252/631; 252/357; 588/252; 106/705; 106/709; 106/713
[58] Field of Search ............... 252/628, 631, 355, 357; 210/751; 588/252, 257; 106/705, 709, 713

[56]        References Cited

U.S. PATENT DOCUMENTS

| | | | |
|---|---|---|---|
| 3,262,274 | 7/1966 | Nelson | 405/128 |
| 3,491,049 | 1/1970 | Gibson et al. | 524/8 |
| 3,885,985 | 5/1975 | Serafin et al. | 106/315 |
| 3,926,886 | 12/1975 | Kelley et al. | 523/414 |
| 4,060,425 | 11/1977 | Harada et al. | 106/671 |
| 4,167,491 | 9/1979 | Gablin et al. | 252/301.1 |
| 4,194,919 | 3/1980 | Hattori et al. | 106/807 |
| 4,416,810 | 11/1983 | Noakes | 252/628 |
| 4,466,836 | 8/1984 | Crump et al. | 106/717 |
| 4,488,910 | 12/1984 | Nicholson et al. | 106/665 |
| 4,569,694 | 2/1986 | Spitz et al. | 106/314 |
| 4,623,469 | 11/1986 | Conner | 210/751 |
| 4,636,336 | 1/1987 | Gay et al. | 252/632 |
| 4,674,574 | 6/1987 | Savoly et al. | 106/293 |
| 4,732,705 | 3/1988 | Laske et al. | 252/628 |
| 4,789,523 | 12/1988 | Schilling | 422/12 |
| 4,842,773 | 6/1989 | Kunz et al. | 252/628 |
| 4,861,377 | 8/1989 | Schilling | 106/277 |
| 4,931,192 | 6/1990 | Covington et al. | 210/751 |
| 4,952,242 | 8/1990 | Earp | 106/709 |
| 4,957,560 | 9/1990 | Schilling | 106/277 |
| 5,016,711 | 5/1991 | Cowan | 166/250 |

FOREIGN PATENT DOCUMENTS

WO91/05586  5/1991  World Int. Prop. O.

OTHER PUBLICATIONS

"Emulsifiers and Emulsifying Techniques," Chemical Technology Review, Noyes Data Review Publishers, 1979, pp. 321-346.
"Arosurf AA Cationic Asphalt Emulsifiers," Sherex Chemicals.

Primary Examiner—Donald P. Walsh
Assistant Examiner—Ngoclan T. Mai
Attorney, Agent, or Firm—Arnold, White & Durkee

[57]        ABSTRACT

A process for solidifying organic waste in cement for transport and storage in solid form by mixing organic waste, water, and a cationic amine to form an emulsion, mixing the emulsion with cement to form a mixture without breaking the emulsion, casting the mixture in a form, and curing the mixture to a solidified form. In a preferred embodiment of the process, a particulate material with a negative surface charge is included in the mixture to neutralize positive charges on the cationic amine and the cement. An alcohol or glycol may be included in the emulsion to enhance the holding power and integrity of the emulsion by controlling size and uniformity of emulsion particle size. The process is applicable to organic wastes such as waste oils, halogenated solvents, non-halogenated solvents, pesticides, herbicides, liquids and sludges containing heavy metals, radioactive mixed wastes and mixtures thereof.

18 Claims, 1 Drawing Sheet

SOLIDIFICATION OF ORGANIC WASTE MATERIALS IN CEMENT

This application is a continuation of copending patent application Ser. No. 07/659,748 filed Feb. 21, 1991 now abandoned.

FIELD OF THE INVENTION

The present invention relates generally to the disposal and storage of organic waste in cement, and more particularly, to the solidification of organic waste in a cement product which is not susceptible to leaching and which has high compressive strength.

BACKGROUND OF THE INVENTION

The federal government controls and dictates the regulation of the nation's hazardous waste through major laws. The Resource Conservation and Recovery Act (RCRA) 1976 and its 1984 amendments, regulate and manage the disposal of currently generated waste. The Comprehensive Environmental Response, Composition and Liability Act (Superfund) of 1980 directs its attention to financing cleanup of abandoned waste disposal sites. These two laws are primarily directed to industry which generates 99% of the nation's hazardous waste as residual by-products. It is estimated that by 1990 this level of hazardous waste production will have reached 280 million metric tons and will have cost many billions of dollars to meet federal compliance standards for safe disposal.

The Environmental Protection Agency has been charged by the federal government with enforcing laws for disposing of hazardous waste. This agency has over 400 specific waste streams listed that require regulation and which fall under broad categories such as waste oil, halogenated solvents, non-halogenated solvents, pesticides and herbicides, metal liquids and sludges, radioactive liquids and solids, mixed waste, etc. Of these many waste streams, it is currently estimated that nearly 90% are managed at the industrial site with no more than 10% being shipped off-site for treatment and disposal. New RCRA laws coming into effect will greatly increase stricter operation of landfills and surface impoundments and will include such requirements as double liners, ground water monitoring, leak detection and leachate collection. It is estimated that these new rules will encourage industry to seek new technology such as incineration, chemical oxidation and chemical stabilization rather than to choose to operate under rigorously enforced landfill operations. Incineration and chemical oxidation methods have not met with public acceptance in the past due to the possibilities of air pollution during their operation. Chemical stabilization, on the other hand, has not suffered this stigma and has the added advantage of being utilized on-site as end pipe treatment allowing the waste to be solidified for safer transport and acceptable landfill disposal. Of the various stabilization techniques being utilized and in development today, encapsulation and solidification methodology holds great promise.

OBJECTS AND SUMMARY OF THE INVENTION

It is a primary object of this invention to provide an improved process for solidifying a broad range of organic wastes in cement (for transport and storage) which permits the loading of a relatively large amount of organic waste into any given amount of cement. In this connection, a related object of the invention is to provide such a process which is applicable to waste oils, halogenated solvents, non-halogenated solvents, pesticides, herbicides, liquids and sludges containing heavy metals, and radioactive mixed wastes.

It is another important object of this invention to provide such a solidification process which results in a solid product which has high compressive strength and a low leaching rate of the organic material from the solidified mass, so that the material can be safely deposited in a waste disposal site for solid wastes.

It is a further object of this invention to provide an improved organic waste solidification process which produces extremely stable emulsions that can be readily mixed with cement without breaking phase, and that provide extremely strong bonding with the cement matrix upon solidification.

A still further object of this invention is to provide an improved organic waste solidification process which requires only a small amount of emulsifier.

Other objects and advantages of this invention will be apparent from the following detailed description and the working examples.

In accordance with the present invention, the foregoing objectives have been realized by providing a process for solidifying organic waste in cement for transport and storage in solid form by mixing organic waste, water, and a cationic amine to form an emulsion, mixing the emulsion with cement to form a mixture without breaking the emulsion, casting the mixture in a form, and curing the mixture to a solidified form. This process enables a large quantity of organic waste to be loaded into any given amount of cement, and produces a solidified mass which has high compressive strength and a low leaching rate. This process also requires only a small amount of the emulsifier.

In a preferred embodiment of the invention, the emulsion also includes a particulate material with a negative surface charge in the mixture to neutralize positive charges on the cationic amine and the cement thereby enhancing their bonding. Particular materials suitable for this purpose are siliceous materials such as fly ash.

In a modified embodiment of the process, the emulsion also includes an alcohol or glycol used to control emulsion particle size to enhance the holding power, thereby permitting even larger quantities of the organic waste to be solidified with the cement, and to enhance the integrity of the structure of the emulsion. Suitable materials for this purpose are $C_1$ to $C_4$ alkanols and ethylene glycol.

DETAILED DESCRIPTION OF PREFERRED EMBODIMENTS

Figure 1:
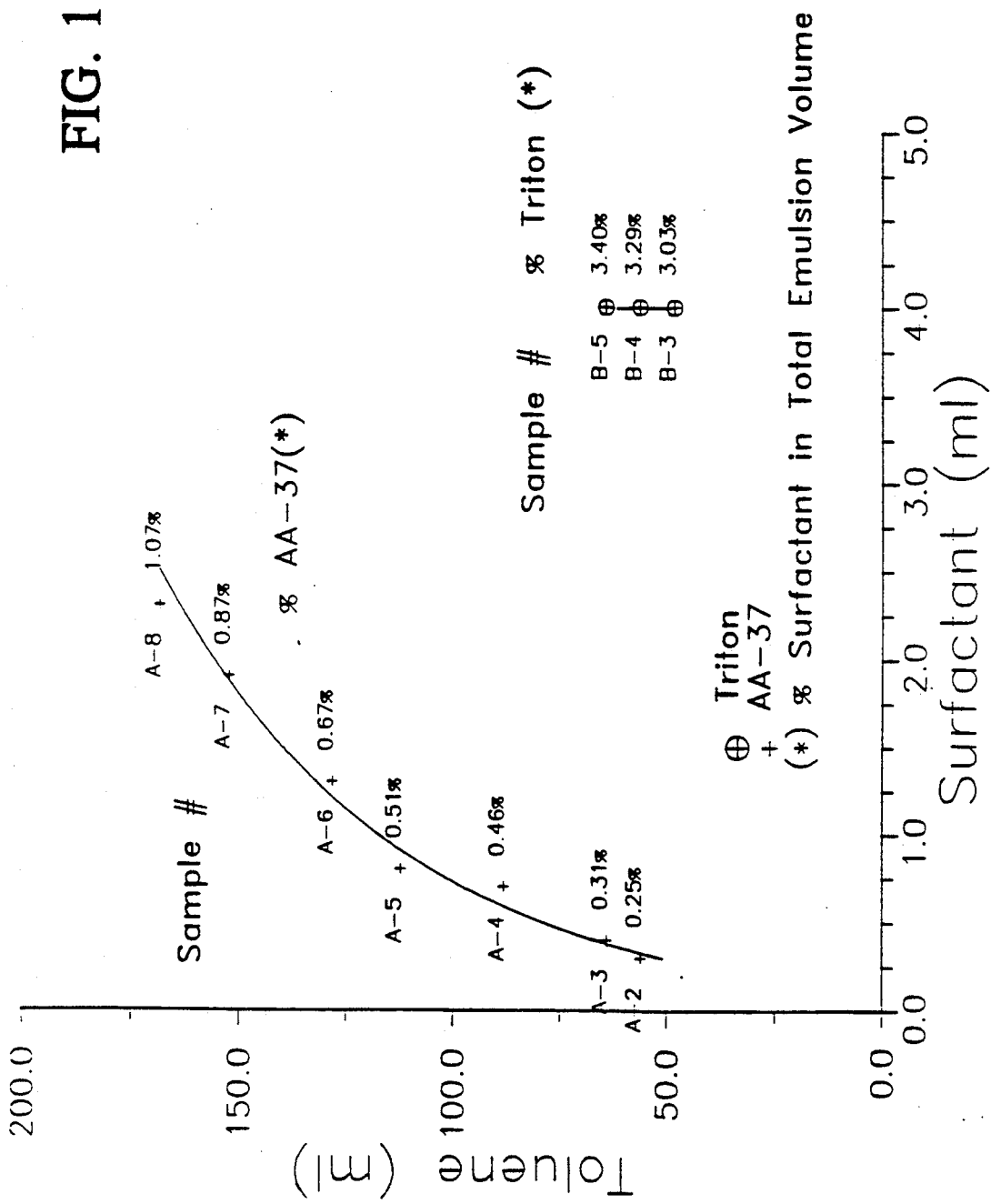
FIG. 1 is a plot of the amount of toluene in a formulation versus the amount of cationic amine surfactant in the formulation for use in predicting the amount of cationic amine required to optimize the emulsion reaction.

While the invention is susceptible to various modifications and alternative forms, specific embodiments thereof will be described in detail, by way of example, herein. It should be understood, however, that it is not intended to limit the invention to the particular forms disclosed. On the contrary, the intention is to cover all modifications, equivalents and alternatives following within the spirit and scope of the invention as defined by the appended claims.

In the preferred embodiment of the process of this invention, an emulsion is formed by mixing a cationic amine with water and the organic waste, with the optional addition of an acid if the amine has not been previously pH neutralized. Normally the water and amine are pre-mixed, and then the organic waste is added to the water-amine mixture and vigorously stirred until an emulsion is formed, but the amine can be directly mixed with the organic waste and water to form the emulsion. Stirring is preferably carried out in a rotary mixer. The organic waste is normally in a liquid form, but when the waste includes solids such as uranium ore, the solid material should be in a finely pulverized state capable of being suspended in a water-amine emulsion.

Cationic amines are used as emulsifying agents in the process of this invention for the formation of the oil-in-water emulsion. Cationic amine emulsifiers which are effective in the present invention include primary, secondary, and tertiary amines, quaternary ammonium salts, alkyl substituted heterocyclic amines, and polyamines such as diamines and triamines.

Primary amines having the formula $R^1NH_2$ wherein $R^1$ is a $C_1$ to $C_{22}$ straight or branched chain aliphatic, hydroxyalkyl, amidoalkyl, carboxyalkyl, cyclic, alkoxy, polyalkoxy or hydroxypolyalkoxy group function as cationic emulsifiers. Representative primary amines include monoethanolamine, monopropanolamine, cyclohexylamine, aniline, and aminophenol.

Secondary amines having the formula $R^1_2NH$ wherein $R^1$ is defined as above are also preferred emulsifiers of the present invention. Dimethylamine, diethylamine, diethanolamine, and diisopropanolamine are typical secondary amine emulsifiers.

Tertiary amines having the formula $R^1_3N$ wherein $R^1$ is defined as above, such as triethylamine, triethanolamine, triisopropanolamine, methyl diallylamine, triisopropylamine, and triallylamine are effective cationic emulsifiers.

Other preferred emulsifiers are quaternary ammonium compounds having the formula $R^1_4N^+X^-$ wherein $R^1$ is defined as above and X is an anion. Examples of quaternary ammonium emulsifiers include benzyl $C_{12}$–$C_{18}$ alkyl dimethylammonium chloride, octadecyltrimethylammonium chloride, cetyltrimethylammonium bromide, n-dodecyltrimethylammonium hydroxide and n-octadecyltri-n-butylammonium nitrate.

Additional cationic amines which function as emulsifiers are polyamines having the formula $R^2_2N((CH_2)_xN)_nR^2_2$ wherein $R^2$ is a hydrogen atom or a $C_1$ to $C_{22}$ straight or branched chain aliphatic, hydroxyalkyl, amidoalkyl, carboxyalkyl, cyclic, alkoxy, polyalkoxy or hydroxypolyalkoxy group, x is an integer of 1 to 3, and n is an integer from 1 to 5. Representative polyamines are ethylenediamine, diethylenetriamine, triethylenetetraamine, tetraethylenepentamine, pentaethylenehexamine, tallow propylenediamine, 1,2-propanediamine, 1,3,5-pentanetriamine, and ethylenediaminetetraacetic acid (EDTA).

Heterocyclic amines including $C_1$ to $C_{22}$ straight or branched chain alkyl substituted imidazolines, morpholines, or piperidines are also useful in the present invention. Typical heterocyclic amines include aminoethyl hexadecyl imidazoline, N-ethyl morpholine, and N-ethyl piperidine.

Many commercial cationic amines are useful in the encapsulation process of the present invention. Examples of such commercial compounds are Ethoquad ® 0/12, a polyethoxylated quaternary ammonium chloride, and Redicote E-11, an ethoxylated diamine available from Armak Industrial Chemicals Division, and Trinoram ® S, a tallow propylene triamine, and Dinoram ® S, a tallow propylene diamine available from Prochinor Dept. of Pierrefitte-Auby, France. Preferred cationic amines such as Arosurf ® emulsifiers commercially available from Sherex Chemical Company, Inc. are described in U.S. Pat. No. 3,975,295. A specific slow-set cationic amine emulsifier designated Arosurf ® AA-37, a benzyl $C_{12}$–$C_{18}$ alkyl dimethyl quaternary ammonium compound, was selected for use in the examples to be described below.

The desired combination of amines to be used is dictated by the physical and chemical properties of the organic waste material to be emulsified. Organic waste materials to be emulsified may best be categorized into two broad groups of materials which are described by their affinity or ability to mix with an aqueous phase to form an oil-in-water emulsion.

Organic waste materials of high molecular weight possessing few, if any, functional groups that would enhance their interaction or hydration with an aqueous phase are best treated using amines having higher carbon numbers. Representative amines include oleyl amine, $C_{12}$ to $C_{15}$ amine ethoxylates, ditridecyl amine, triisooctyl amine, and oleyl diamine.

Organic waste materials of low molecular weight possessing functional groups that enhance their interaction with an aqueous phase are best treated with amines having lower carbon numbers. These amines are less complex compounds which typically have $C_1$ to $C_{10}$ groups. Representative amines include dimethylamine, triethylamine, ethylenediamine, phenylamine, ethanolamine and diethanolamine. Since most organic wastes to be emulsified are a combination or mixture of many waste streams, it is necessary in many cases to use a combination of cationic amines to obtain the necessary physical and chemical properties for emulsion formation.

In the formation of the emulsion it may be advantageous to use additives to further enhance emulsion formation. An acid may be added to neutralize the amine prior to or during the formation of the emulsion. Alternatively, the amine may be preneutralized before it is mixed with the cement. A secondary amine may also be used to maintain a neutral pH after the addition of an acid and before the mixing of the organic material. An inorganic acid may not be required for amine neutralization when EDTA is used in conjunction with other basic amines as the cationic amines of the present invention.

A preferred process of the present invention uses EDTA which has been neutralized preferably with alkali salt solutions as the cationic amine of the emulsion. The neutralized EDTA hastens the setup of the cement mixture and improves the structural properties of the cured cement mixture.

One of the advantages of the process of this invention is that a relatively small amount of the cationic amine emulsifier is required to form the desired emulsion. It is preferred that the amine be less than 2% by volume of the water-amine-waste emulsion, and in many applications the amine can be less than 1% of that emulsion. As will be described in more detail below in connection with the working examples, the amount of amine needed to form an emulsion from any particular combination of materials can be determined prior to actual mixing of the materials, thereby avoiding the use of excess amounts of emulsifier which can weaken the emulsion.

Another advantage of this process is that it permits the emulsion to be highly loaded with the organic waste material. In the preferred process, the water-amine-waste emulsion contains a greater volume of organic waste than water, and in many applications the volume ratio of the organic waste to the water can be 2:1, 3:1 or even higher.

After the waste-containing emulsion has been formed, that emulsion is mixed with an amount of cement chosen to provide the desired weight ratio of cement to water. This ratio is typically about the same as described in Noakes U.S. Pat. No. 4,416,810, namely, 100 parts by weight of cement for each 30 to 40 parts by weight water, but since the organic to water ratio using cationic amines has been found to be much higher, considerably more organic waste can be encapsulated than previously thought possible.

After the cement has been blended with the emulsion, the resulting mixture can be poured into any desired form, such as a mold or drums of varying volume, and allowed to solidify. The solidified mass can then be transported and stored in the forming container, or it can be removed from the form and stored as a self-supporting mass.

To evaluate the effectiveness of cationic amines in forming oil-in-water emulsions using organic solvents, emulsions made with the Triton ® X-100 nonionic surfactant described in Noakes U.S. Pat. No. 4,416,810 were compared with like oil-in-water emulsion using the cationic amine Arosurf ® AA-37 as the emulsifier (Table I). Toluene was the organic waste material in both emulsions. When the emulsion capabilities of the two emulsifiers were compared, it was found that the cationic amine emulsifier required approximately 1/10 the amount of emulsifier used in the Triton ® mix, and the cationic amine was able to hold considerably more toluene in the emulsion without breaking into two phases on mixing with cement. In fact, no upper limit on the ratio of toluene-in-water cationic emulsion was realized in testing up to a ratio of 2.63. The first column of Table I, showing the Triton ® response, is identical to that shown in the "B" series of the first table in the Noakes U.S. Pat. No. 4,416,810.

The procedures used for making up the water-toluene-nonionic surfactant emulsions are described in the Noakes U.S. Pat. No. 4,416,810. The procedure used for making up the toluene-water-cationic amine emulsion was as follows: Arosurf ® AA-37 was purchased as a fully pH-neutralized cationic amine, so that no acid was needed in the mixture; the amine was added to the water and stirred; the toluene was added to the amine-water mixture in a blender at 2000 rpm and stirred for 3 to 4 minutes; and the resulting emulsion was blended with cement and then poured into a mold to harden.

To evaluate the compressive strengths of the various mixes, the amine-toluene-water cement mixes were poured into standard 3"×6" molds (cylindrical molds having a diameter of 3 inches and a height of 6 inches). After 28 days of curing, testing was carried out in a Baldwin Universal Testing Machine having a 400,000 lb. capacity to determine the maximum compressive loads for cylindrical samples from each of the different mixtures. Each sample was weighed to check uniformity. Each cylinder was measured to determine its cross-sectional area, capped with a sulfur compound to assure that the cylinder ends were flat and parallel so that compressive testing would provide uniform stress, and loaded in compression until failure in the Baldwin Universal Testing Machine. The maximum loads were divided by the area of the cylinder to give the ultimate compressive strength in pounds per square inch (psi) for each sample. The resulting data is recorded in Table II.

It can be seen from Tables I and II that the cationic amine produced emulsions with considerably higher holding capacity for the organic phase, that only one-tenth of the amount of emulsifier was needed as compared with the nonionic surfactant, and that the final solidified cement samples were superior in structural integrity.

BRIEF DESCRIPTION OF THE DRAWING

One of the advantages of the process of this invention is that a simple graph of the type illustrated in FIG. 1 can be used to accurately predict the amount of amine needed to optimize the emulsion reaction. This avoids overloading the emulsifier in the emulsion action, as illustrated by the Triton ® emulsifier, so that it is able to better encapsulate with near-stoichiometric levels of waste. The data in FIG. 1 was compiled from Table I. For this particular application (Arosurf ® AA-37 amine and toluene), the optimum amount of amine can be determined from the equation:

$$\text{Amine Needed (ml)} = 0.12 \exp(0.018 \times \text{toluene (ml)})$$

A particularly useful additive for the emulsions of this invention is a particulate material with a negative surface charge, to neutralize like positive charge repulsion on the cationic emulsifier and the cement. Siliceous materials such as fly ash are particularly useful for this purpose. Fly ash is both abundant and inexpensive. The composition of a typical coal fly ash is presented in Table III, from it can be seen that the fly ash has a high silica content.

To evaluate the effect of adding a negative surface-charged component to the aqueous cationic amine-toluene emulsion (during its formation prior to mixing with the cement), a series of tests were conducted with fly ash added at the time of make up of an aqueous amine-toluene emulsion. The amount of fly ash added was calculated as a percent of the weight of organic solvent in the emulsion. For example, to produce a 25% fly ash mixture, as calculated from the A-6 mixture in Table II (2:1 toluene:water with 1.3 ml Arosurf ® AA-37), 128 ml of toluene×0.866 g/ml (toluene density)=110 g×0.25 (percent)=28 g of fly ash was added.

Table IV shows the structural integrity of cement cylinders of the A-6 composition cast in 3"×6" cylinders. Measurements were made with the same equipment previously described to produce the data in Table II. The data in Table IV shows that the most optimum content of fly ash is 75% wt/wt of organic solvent. These samples were prepared using the A-6 formula with a 2:1 ratio of toluene and water, and 1.3 ml Arosurf ® AA-37 mixed in a Waring blender for 2-3 minutes at 2000 rpm. The resulting emulsion was mixed with fly ash which had been sieved to pass through a 200 mesh screen. Upon mixing the emulsion with the fly ash, air entrapped bubbles in the emulsion were released with no phase separation. The mixture was then blended with cement and poured into a 3"×6" mold for solidification. After 28 days these cylinders were tested for rupture pressure.

In order to evaluate the degree of leachability of the toluene encapsulated in the cement cylinders of varying fly ash content, a series of cement cylinders was made up as shown in Table V and subjected to leach testing after 28 days of curing. Four 7-day leach tests were conducted on the cylinders which had fly ash contents ranging from 0 to 100% in 25% increments. Each test ran for 7 days at which time a toluene analysis of the aqueous leachate was made, and the next 7-day leach period was performed with new water. In this way, a 28-day leach test was conducted in four 7-day increments.

The procedure followed for determining the liquid release of toluene solvent during aqueous leaching was to place each cylinder in a 4000 milliliter volume sealable container which contained 1000 milliliters of distilled water. This volume of water was selected as it fully covered the cylinders. The containers were also uniquely designed so as to allow syringe extraction of the water without opening to the atmosphere.

Aqueous leaching of the solid waste cylinders was carried out for multi-successive seven-day leach periods. After each seven days, a 40-milliliter water sample was collected for measurement by gas chromatography.

Analyses were carried out by the University of Georgia Cooperative Extension Pesticide Laboratory using a Tracor model 540 Gas Chromatograph equipped with a flame ionization detector and a FFAP glass packed column. Samples were run isothermally at 35° and 300° C., respectively, using a nitrogen gas carrier at a flow rate of 10 milliliters per minute. Concentration levels of the leached toluene in the liquid and gaseous samples were determined by comparison with known standards. The data collected from the leachability studies is tabulated in Table V.

Table V shows that the 75% fly ash had the best capability to hold the toluene solvent in the cement throughout the 28-day leach period and matches well with the structural integrity data at the 75% fly ash level in Table IV.

Mono and poly hydroxyl additives can be used to slow the hydration time and thereby retard the solidification of the waste-encapsulating cement mixtures. The advantages realized in using such additives to the cationic amine emulsion formulation are multifold. First, the smaller size of the micelles in the emulsion enables greater concentration levels of the organic phase to be emulsified. Secondly, the emulsion is more readily formed and is more durable in its ability to resist two-phase separation, especially when it is mixed with high-surface-area solids such as fly ash and cement. Also, only 0.1% by volume concentration levels of alcohol greatly reduce foaming of the emulsion during blending, which eliminates the problem of air entrapment into the emulsion which could be carried over to the cement.

A 2 to 1 by volume kerosene-in-water emulsion was made up using 128 ml of kerosene blended with a mixture of 64 ml water and 1.3 ml Arosurf® AA-37 cationic amine. Short carbon chain mono and poly alcohols were added at the 0.1%, 0.5% and 1.0% levels. All alcohols tested were mixed with the aqueous phase prior to forming the emulsion. Each of these emulsions was visually evaluated for micelle size, uniformity and distribution using a Zeiss microscope with 640× magnification, with each evaluation based on 15 or more observations. Particle sizes ranged from less than 1 micrometer to greater than 35 micrometers.

Table VI shows the results of these examples and indicates that the mono and poly alcohols greatly reduced the diversity and size of the micelle population making up the emulsion. Butanol at the 1.0% by volume level was only partially miscible and should be considered, as should higher carbon alcohols, best used when mixed with the organic phase prior to emulsion formation.

The following examples illustrate the excellent capability and wide versatility of the method of this invention for encapsulating in cement a wide spectrum of different industrially generated waste streams. Specifically, the following examples illustrate the encapsulation of (1) waste oils (kerosene), (2) non-halogenated hydrocarbons (benzene), (3) halogenated hydrocarbons (chlorobenzene), (4) insecticides (aldrin), (5) heavy metal liquids and sludges (Pb, Cd, Zn ppts), and (6) radioactive mixed wastes (uranium ore and toluene).

EXAMPLE 1

Kerosene was used as an example of the type of compound frequently found in the waste oil category and was solidified in the following manner. A 2 to 1 by volume kerosene-in-water emulsion was made up by mixing 128 ml kerosene with a mixture of 64 ml water, 1.3 ml Arosurf® AA-37 cationic amine, and 1 ml isopropyl alcohol and blended in a Waring blender for 3 to 5 minutes at 2000 rpm. The emulsion was mixed with 76 grams of fly ash for cationic positive charge neutralization, and then the total mixture was blended with 200 grams of #2 type cement sieved to 200 mesh. The mixture was made in quantity, poured into a cylindrical mold having a diameter of 3 inches and a height of 6 inches, and cured for 28 days to a solid mass. The resulting cylinders were subjected to a 28-day aqueous leach test and a compressive stress test, with the results shown in Table VII. These results show only minimal release of kerosene from the cement cylinder through the 28-day leach period, and an acceptable load compressive stress of 3,100 pounds.

EXAMPLE 2

Benzene was selected as an example of a hydrocarbon compound frequently listed in the non-halogenated category. Again, as in Example 1, a 2 to 1 by volume benzene-in-water emulsion was made up by mixing 128 ml benzene with a mixture of 64 ml water, 1.3 ml Arosurf® AA-37 cationic amine and 1 ml isopropyl alcohol and blended in a Waring blender for 3 to 5 minutes at 2000 rpm. The emulsion was mixed with 76 grams of fly ash for cationic positive charge neutralization, and the resulting mixture was blended with 200 grams of #2 cement. The cement mixture was poured into a cylindrical mold having a diameter of 3 inches and a height of 6 inches, and cured for 28 days to a solid mass. The resulting cylinders were subjected to a 28-day aqueous leach test and a compressive stress test, with the results shown in Table VIII. These results show only minimal amounts of benzene (in the ppm level) were released during the 28-day leach period, and a good load compressive stress of 13,000 pounds.

EXAMPLE 3

Chlorobenzene was selected as a typical compound that would be listed in the halogenated hydrocarbon category. Again, a 2 to 1 by volume chlorobenzene-in-water emulsion was made by mixing 128 ml of chlorobenzene with a mixture of 64 ml water, 1.3 ml Arosurf® AA-37 cationic amine and 1 ml isopropyl alcohol and blended in a Waring blender for 3 to 5 minutes at 2000 rpm. The resulting emulsion was mixed with 76 grams of fly ash for cationic positive charge neutralization, and the resulting mixture was blended with 200 grams of #2 cement. The cement mixture was poured into a cylindrical mold having a diameter of 3 inches and a height of 6 inches and cured for 28 days to a solid mass. The resulting cylinders were subjected to a 28-day aqueous leach test and a compressive stress test, with the results shown in Table IX. These results show only minimal amounts of chlorobenzene were released during the 28-day leach period and a good load compressive stress of 14,300 pounds.

EXAMPLE 4

Aldrin, a chlorinated insecticide which is no longer commercially used because of excessive toxicity properties, was selected as typical of a compound to appear in the insecticide waste category. A 2 to 1 by volume kerosene-in-water emulsion containing this compound was made up in the following manner. A 10% wt./wt. solution of aldrin in kerosene was made up by dissolving 11.4 grams aldrin in 128 ml kerosene. An emulsion was then formed by mixing the resulting solution with 64 ml water, 1.8 ml Arosurf® AA-37 cationic amine, and 1 ml isopropyl alcohol and blending in a Waring blender for 6 to 8 minutes at a speed of 2000 rpm. The emulsion was mixed with 82 grams of fly ash for cationic positive charge neutralization, and the total mixture was blended with 200 grams of #2 cement. The cement mixture was then poured into a cylindrical mold having a diameter of 3 inches and a height of 6 inches and cured for 28 days to a solid mass. The resulting cylinders were subjected to a 28-day leach test and a compressive stress test, with the results shown in Table X. These results showed only minimal aldrin release for the 28-day test period, and an acceptable compressive test value of 3,800 pounds.

EXAMPLE 5

A watery precipitate containing lead, cadmium, and zinc was made up to represent a heavy metal liquid-sludge material found in the metal liquid-sludge waste category. The sample preparation was carried out by preparing a 3-liter aqueous solution containing 1000 ppm each of the three metals. The solution was acidified to a pH of 5 to 6, and a complexing compound (Triplex) was added to form a precipitate which removed the metals from solution with >99% efficiency, forming a coagulated watery metal-organic precipitate.

This quasi liquid-sludge mixture representing a volume of approximately 192 ml was mixed with 64 ml water, 1.8 ml Arosurf® AA-37 cationic amine and 1 ml isopropyl alcohol and formed into an emulsion by blending in a Waring blender for 6 minutes at 2000 rpm. The resulting emulsion was mixed with 77 grams of fly ash for cationic positive charge neutralization, and the total mixture was then blended with 200 grams of #2 cement. The cement mixture was poured into a cylindrical mold having a diameter of 3 inches and a height of 6 inches, and cured for 28 days to a solid mass. The resulting cylinders were subjected to a 28-day aqueous leach test and a compressive stress test, with the results shown in Table XI. These results show no detectable leach of heavy metals during the 28-day test period, and a high compressive test value of 24,700 pounds, showing excellent integrity.

EXAMPLE 6

A mixture of uranium ore and toluene was selected as perhaps typical of what one would find in a radioactive mix waste category. The encapsulation of this mixture was carried out by forming a 2 to 1 by volume toluene-in-water emulsion by mixing 128 ml toluene with a mixture of 64 ml water, 1.5 ml Arosurf® AA-37 cationic amine and 1 ml isopropyl alcohol and blending in a Waring blender for 5 minutes at a speed of 2000 rpm. The resulting emulsion was mixed with 76 grams of uranium ore (0.4% U) of high alumino-silicate which had been crushed and sieved to a 200 mesh particle size. Upon mixing the emulsion with the ore, the high silicate content of the ore acted to neutralize the cationic amine charge in a similar manner to that of the fly ash. This mixture was blended by constant stirring with 200 grams of #2 cement, and the total mixture was poured into a cylindrical mold having a diameter of 3 inches and a height of 6 inches, for curing. After 28 days the cement had solidified to a solid mass. The resulting cylinders were subjected to a 28 day aqueous leach test and a compressive stress test with the results shown in Table XII. These results show no detectable uranium leached from the cylinder during the 28-day leach period and an exceptionally high compressive test of 13,900 pounds, indicating good structural integrity.

TABLE I

Comparative Formulation Using Triton ® 100 and Arosurf ® AA-37 for Cement-Toluene Encapsulation

| Triton ® | Ratio Toluene/H₂O | Arosurf ® AA-37 |
|---|---|---|
| B-3 200 g cement<br>48 ml toulene<br>4 ml Triton ®<br>64 ml H₂O | 48/64 (0.75) | |
| B-4 200 g cement<br>56 ml toluene<br>4 ml Triton ®<br>64 ml H₂O | 56/64 (0.88) | A-2 200 g cement<br>56 ml toluene<br>0.3 ml AA-37<br>64 ml H₂O |
| B-5 200 g cement<br>64 ml toluene<br>4 ml Triton ®<br>64 ml H₂O | 64/64 (1.00) | A-3 200 g cement<br>64 ml toluene<br>0.4 ml AA-37<br>64 ml H₂O |
| B-6 Micelle failure | 88/64 (1.38) | A-4 200 g cement<br>88 ml toluene<br>0.7 ml AA-37<br>64 ml H₂O |
| | 112/64 (1.75) | A-5 200 g cement<br>112 ml toluene<br>0.9 ml AA-37<br>64 ml H₂O |
| | 128/64 (2.00) | A-6 200 g cement<br>128 ml toluene<br>1.3 ml AA-37<br>64 ml H₂O |
| | 152/64 (2.38) | A-7 200 g cement<br>152 ml toluene<br>1.9 ml AA-37<br>64 ml H₂O |
| | 168/64 (2.63) | A-8 200 g cement<br>168 ml toluene<br>2.5 ml AA-37<br>64 ml H₂O |

TABLE II

Average Ultimate Compressive Stress Tests
of Cement Cylinders Containing Toluene and Triton ®
or Arosurf ® AA-37 Dispersant
Sample Size: 3-inch diameter for 6-inch cylinder height

| Sample Triton ® | Average 3 tests (psi) | Ratio Toluene/H$_2$O | Sample Arosurf ® AA-37 | Average 3 tests (psi) |
|---|---|---|---|---|
| B-3 | 3180 | 0.75 | — | — |
| B-4 | 2500 | 0.88 | A-2 | 3980 |
| B-5 | 1860 | 1.00 | A-3 | 2697 |
| — | — | 1.38 | A-4 | 1433 |
| — | — | 1.75 | A-5 | 870 |
| — | — | 2.00 | A-6 | 620 |
| — | — | 2.33 | A-7 | 295 |
| — | — | 2.63 | A-8 | 219 |

TABLE III

Typical Chemical Parameters of Coal Fly Ash

| Element/Parameter | Typical Range of Concentration |
|---|---|
| 1. Silica (SiO$_2$) | 50–60% |
| Amorphus | 39–56% |
| Crystalline | 2–4% |
| 2. Alumina (Al$_2$O$_3$) | 17–25% |
| 3. Iron oxide (Fe$_2$O$_3$) | 3–30% |
| 4. Calcium oxide (CaO) | 3.8–6.4% |
| 5. Magnesium oxide (MgO) | 1.0–2.0% |
| 6. Potassium oxide (K$_2$O) | 0.5–1.9% |
| 7. Titanium dioxide (TiO$_2$) | 0.5–0.7% |
| 8. Sulfur trioxide (SO$_3$) | 0.1–0.5% |
| 9. Phosphorous pentoxide (P$_2$O$_5$) | 0.5–0.75% |
| 10. pH | 4–8 |

TABLE IV

Average Ultimate Compressive Stress Tests
on Cement Cylinders of A-6 Chemical Composition
with Varying Fly Ash (F.A.) Content

| Sample I.D. | Fly Ash Content % wt./wt. F.A/organic | Load Capacity 55 gal. drum (lbs.) |
|---|---|---|
| A-6-0 | 0 | 246,549 |
| A-6-25 | 25 | 319,670 |
| A-6-50 | 50 | 450,913 |
| A-6-75 | 75 | 634,654 |
| A-6-100 | 100 | 583,094 |

TABLE V

28 Day Aqueous Leach Test of Cement Cylinders
of A-6 Chemical Composition
with Varying Fly Ash (F.A.) Content

| Time (days) | 0% F.A. Toluene (ppb) | 25% F.A. Toluene (ppb) | 50% F.A. Toluene (ppb) | 75% F.A. Toluene (ppb) | 100% F.A. Toluene (ppb) |
|---|---|---|---|---|---|
| 7 | 52,600 | 92,000 | 116,000 | 32,700 | 69,800 |
| 14 | 61,500 | 58,500 | 94,300 | 20,900 | 83,800 |
| 21 | 42,400 | 40,320 | 56,525 | 12,975 | 33,451 |
| 28 | 43,000 | 21,500 | 37,960 | 7,841 | 12,200 |

% Fly Ash calculated on the percent wt./wt. ratio of F.A./organic constituent (toluene). Detection Limit for toluene 50 parts per billion (ppb).

TABLE VI

Microscopic Particle Size Analyses
of Kerosene in Water Cationic Arosurf ® AA-37 Emulsion
with Varying Concentrations of Short
Chain Alcohols in Aqueous Phase

| Emulsion + Alcohol A-6 Kerosene + Water + AA-37 = E | Largest Particle Size (μm) | Medium Particle Size (μm) | Smallest Particle Size (μm) |
|---|---|---|---|
| 1. E + zero alcohol | 31.5 | 9.79 | 2.5 |
| 2. E + methanol (.1%) | 35.7 | 9.79 | 2.5 |
| 3. E + methanol (.5%) | 8.4 | 1.13 | 2.1 |
| 4. E + methanol (1.0%) | 10.5 | 7.0 | 4.2 |
| 5. E + ethanol (.1%) | 10.5 | 3.5 | 2.1 |
| 6. E + ethanol (.5%) | 10.5 | 1.33 | <1.0 |
| 7. E + ethanol (1.0%) | 7.35 | 1.59 | <1.0 |
| 8. E + 2-propanol (.1%) | 7.35 | 3.36 | 3.15 |
| 9. E + 2-propanol (.5%) | 7.35 | 1.90 | <1.0 |
| 10. E + 2-propanol (1.0%) | 6.3 | 1.89 | 0.84 |
| 11. E + butanol (.1%) | 46.2 | 12.8 | 2.1 |
| 12. E + butanol (.5%) | 5.25 | 1.47 | <1.0 |
| 13. E + butanol (1.0%) | | 2 phase | |
| 14. E + ethylene glycol (.1%) | 10.5 | 3.36 | 7.0 |
| 15. E + ethylene glycol (.5%) | 10.5 | 4.34 | 2.1 |
| 16. E + ethylene glycol (1.0%) | — | — | — |

Emulsion (E) made up as blended mixture of 128 ml kerosene, 1.3 ml Arosurf ® AA-37 amine in 64 cc water; alcohol added to aqueous phase in 1-5-10% of total emulsion volume.
All measurements made in micrometers (μm)
Magnification of Zeiss Microscope (640x)
Sample number evaluation where n = 15 for each analysis.

TABLE VII

28 Day Aqueous Leach and Compressive Stress Test
on Kerosene Waste Encapsulated Cement Cylinders

| Compound | 7 day (ppm) | 14 day (ppm) | 21 day (ppm) | 28 day (ppm) |
|---|---|---|---|---|
| I. Chemical Analysis - (GC) | | | | |
| Kerosene | 3.90 | 2.73 | 2.30 | 2.01 |
| GC: Gas Chromatography | | | | |
| Minimum Detection Limit (MDL): | | | | |
| 0.2 parts per million (ppm) | | | | |
| II. Compressive Stress Test | | | | |
| Load Capacity: 3,100 lbs. | | | | |

TABLE VIII

28 Day Aqueous Leach and Compressive Stress Test
on Benzene Waste Encapsulated Cement Cylinders

| | Leach period | | | |
|---|---|---|---|---|
| Compound | 7 day (ppm) | 14 day (ppm) | 21 day (ppm) | 28 day (ppm) |
| I. Chemical Analysis - GC | 265 | 140.5 | 81.3 | 51.7 |
| Benzene | | | | |
| GC: Gas Chromatography | | | | |
| Minimum Detection Limit: | | | | |
| 0.5 parts per million (ppm) | | | | |
| II. Compressive Stress Test | | | | |
| Load Capacity: 13,000 lbs. | | | | |

TABLE IX

28 Day Aqueous Leach and Compressive Stress Test
on Chlorobenzene Waste Encapsulated Cement Cylinders

| | Leach period | | | |
|---|---|---|---|---|
| Compound | 7 day (ppm) | 14 day (ppm) | 21 day (ppm) | 28 day (ppm) |
| I. Chemical Analysis - GC | | | | |
| Chlorobenzene | 16.3 | 5.47 | 4.0 | 2.15 |
| GC: Gas Chromatography | | | | |
| Minimum Detection Limit: | | | | |
| 0.5 parts per million (ppm) | | | | |
| II. Compressive Stress Test | | | | |
| Load Capacity: 14,300 lbs. | | | | |

TABLE X

28 Day Aqueous Leach and Compressive Stress Test
on Aldrin-Kerosene Waste Encapsulated Cement Cylinders

| | Leach period | | | |
|---|---|---|---|---|
| Compound | 7 day (ppm) | 14 day (ppm) | 21 day (ppm) | 28 day (ppm) |
| I. Chemical Analysis - (GC) | | | | |
| Aldrin | 3.96 | 0.74 | 0.43 | 0.19 |
| GC: Gas Chromatography | | | | |
| Minimum Detection Limit (MDL): | | | | |
| 0.1 parts per million (ppm) | | | | |
| II. Compressive Stress Test | | | | |
| Load Capacity: 3,800 lbs. | | | | |

TABLE XI

28 Day Aqueous Leach and Compressive Stress Test
on Heavy Metal (Zn, Cd, Pb) Sludge
Encapsulated Cement Cylinders

| | Leach period | | | |
|---|---|---|---|---|
| Element | 7 day (ppm) | 14 day (ppm) | 21 day (ppm) | 28 day (ppm) |
| I. Elemental Analysis - (ICAP) | | | | |
| Zinc | <MDL | <MDL | <MDL | <MDL |
| Cadmium | <MDL | <MDL | <MDL | <MDL |
| Lead | <MDL | <MDL | <MDL | <MDL |
| ICAP: Inductive- | | | | |
| ly Coupled Argon | | | | |
| Plasma | | | | |
| Minimum Detection Limit (MDL): | | | | |
| Cadmium 0.5 ppm | | | | |
| Lead 0.5 ppm | | | | |
| Zinc 0.05 ppm | | | | |
| II. Compressive Stress Test | | | | |
| Load Capacity: 24,700 lbs. | | | | |

TABLE XII

28 Day Aqueous Leach and Compressive Stress Test
on Uranium Ore Mixed Encapsulated Cement Cylinders

| | Leach period | | | |
|---|---|---|---|---|
| Element | 7 day (ppm) | 14 day (ppm) | 21 day (ppm) | 28 day (ppm) |
| I. Elemental Analysis - (ICAP) | | | | |
| Uranium | <MDL | <MDL | <MDL | <MDL |
| ICAP: Inductively Coupled Argon Plasma | | | | |
| Minimum Detection Limit (MDL): | | | | |
| Uranium 1.0 ppm | | | | |
| II. Compressive Stress Test | | | | |
| Load Capacity: 13,900 lbs. | | | | |

I claim:

1. A process for solidifying organic waste in cement for transport and storage in solid form, said process comprising the steps of: mixing organic waste, water, and a cationic amine to form an oil-in-water emulsion; mixing the emulsion with cement to form a mixture without breaking the emulsion; casting the mixture in a form; and curing the mixture to a solidified form.

2. The process of claim 1 wherein a particulate material with a negative surface charge is included in said emulsion to neutralize positive charges on said cationic amine and said cement.

3. The process of claim 2 wherein said particulate material is a siliceous material.

4. The process of claim 3 wherein said siliceous material is fly ash.

5. The process of claim 1 wherein an alcohol or glycol is included in said emulsion to enhance holding power and integrity of said emulsion by controlling size and uniformity of emulsion particle size.

6. The process of claim 5 wherein said alcohol is a straight or branched chain $C_1$ to $C_4$ alkanol, and said glycol is ethylene glycol.

7. The process of claim 1 wherein said organic waste is selected from the group consisting of waste oils, halogenated solvents, non-halogenated solvents, pesticides, herbicides, liquids and sludges containing heavy metals, radioactive mixed wastes and mixtures thereof.

8. The process of claim 1 wherein the pH of said emulsion is essentially neutral.

9. The process of claim 1 wherein said organic waste is in the form of a liquid or finely divided particulate material capable of being suspended in a water-amine emulsion.

10. The process of claim 2 wherein said organic waste is an organic solvent, and said mixture contains about 75% by weight particulate material based on the weight of said organic solvent.

11. the process of claim 1 wherein said emulsion contains less than 2% by volume of the cationic amine.

12. The process of claim 1 wherein said emulsion contains a greater volume of organic waste than water.

13. The process of claim 1 wherein the ratio of organic waste to water in said emulsion is at least 3:1 by volume.

14. The process of claim 1 wherein said organic waste is a mixture of different organic waste materials, and said cationic amine is a mixture of different cationic amines selected to emulsify the different organic waste materials when mixed therewith in water.

15. The process of claim 1 further including the step of storing the solidified form in a waste disposal site.

16. The process of claim 1 wherein the cationic amine is selected from the group consisting of primary amines having the formula $R^1NH_2$, secondary amines having the formula $R^1{}_2NH$, tertiary amines having the formula $R^1{}_3N$, and quaternary ammonium compounds having the formula $R^1{}_4N^+X^-$ wherein $R^1$ is a $C_1$ to $C_{22}$ straight or branched chain aliphatic, hydroxyalkyl, amidoalkyl, carboxyalkyl, cyclic, alkoxy, polyalkoxy or hydroxypolyalkoxy group, and X is an anion; polyamines having the formula $R^2{}_2N((CH_2)_xN)_nR^2{}_2$ wherein $R^2$ is a hydrogen atom or a $C_1$ to $C_{22}$ straight or branched chain aliphatic, hydroxyalkyl, amidoalkyl, carboxyalkyl, cyclic, alkoxy, polyalkoxy or hydroxypolyalkoxy group, x is an integer of 1 to 3, and n is an integer from 1 to 5; and $C_1$ to $C_{22}$ straight or branched chain alkyl substituted imidazolines, morpholines, or piperidines.

17. The process of claim 16 wherein said cationic amine is ethylenediaminetetraacetic acid.

18. The process of claim 16 wherein said cationic amine is a benzyl $C_{12}$ to $C_{18}$ alkyl dimethylammonium halide.

* * * * *